US012622825B2

(12) United States Patent
Nakagawa

(10) Patent No.: US 12,622,825 B2
(45) Date of Patent: May 12, 2026

(54) WHEELCHAIR FIXING DEVICE AND WHEELCHAIR FIXING SYSTEM

(71) Applicant: TOYOTA JIDOSHA KABUSHIKI KAISHA, Toyota (JP)

(72) Inventor: Shigeru Nakagawa, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 423 days.

(21) Appl. No.: 18/374,709

(22) Filed: Sep. 29, 2023

(65) Prior Publication Data

US 2024/0130907 A1 Apr. 25, 2024
US 2024/0225927 A9 Jul. 11, 2024

(30) Foreign Application Priority Data

Oct. 21, 2022 (JP) ................................ 2022-169510

(51) Int. Cl.
*A61G 3/08* (2006.01)

(52) U.S. Cl.
CPC .................................. *A61G 3/0808* (2013.01)

(58) Field of Classification Search
CPC ................................ A61G 3/0808; A61G 3/08
USPC ......................................................... 296/1.04
See application file for complete search history.

(56) References Cited

U.S. PATENT DOCUMENTS

| | | | | |
|---|---|---|---|---|
| 5,628,595 A * | 5/1997 | Harris | A61G 3/0808 | 410/7 |
| 6,352,396 B1 * | 3/2002 | Budd | A61G 3/0808 | 410/80 |
| 2024/0398636 A1 * | 12/2024 | Schwarz | A61G 3/0808 | |

FOREIGN PATENT DOCUMENTS

| | | | |
|---|---|---|---|
| JP | 2002165839 A | * | 6/2002 |
| JP | 2006000175 A | * | 1/2006 |
| JP | 2018-102728 A | | 7/2018 |
| JP | 2018102580 A | * | 7/2018 |
| JP | 2024046394 A | * | 4/2024 |
| JP | 2024049460 A | * | 4/2024 |
| JP | 2025103568 A | * | 7/2025 |

* cited by examiner

*Primary Examiner* — Jason S Morrow
(74) *Attorney, Agent, or Firm* — Dinsmore & Shohl LLP

(57) ABSTRACT

A wheelchair fixing device includes a support member that is provided on a base member and supports the drive mechanism, a slide shaft, a pair of lock arms that is provided on both sides of the base member, the lock arms being configured to turn toward a downward side and to pin down a fixing bar of the wheelchair due to the slide shaft moving in the backward direction, and being configured to turn toward the upward side and to release pinning down of the fixing bar due to the slide shaft moving in the advancing direction, a pair of switch arm mechanisms configured to turn due to being pressed by the fixing bar of the wheelchair, and lock switches configured to drive the drive mechanism by being pressed by the switch arm mechanisms, such that the slide shaft is moved in the backward direction.

12 Claims, 9 Drawing Sheets

WHEELCHAIR FIXING DEVICE AND WHEELCHAIR FIXING SYSTEM

CROSS-REFERENCE TO RELATED APPLICATION

This application claims priority to Japanese Patent Application No. 2022-169510 filed on Oct. 21, 2022, incorporated herein by reference in its entirety.

BACKGROUND

1. Technical Field

The present disclosure relates to a wheelchair fixing device and a wheelchair fixing system.

2. Description of Related Art

There is known a wheelchair fixing device capable of automatically restraining a wheelchair (e.g., see Japanese Unexamined Patent Application Publication No. 2018-102728 (JP 2018-102728 A)).

SUMMARY

However, according to the wheelchair fixing device such as described above, the mechanism of the device itself is complicated.

The present disclosure provides a wheelchair fixing device in which the mechanism of the device itself can be simplified.

A wheelchair fixing device according to a first aspect of the present disclosure includes a drive mechanism, a support member that is provided on a base member attached to a floor of a vehicle, and that supports the drive mechanism, a slide shaft that is configured to move in an advancing direction and a backward direction of a wheelchair, by being driven by the drive mechanism, a pair of lock arms that is provided on both sides of the base member so as to turn in an up-down direction and that has cam hole portions into which end portions of the slide shaft are respectively inserted, the lock arms being configured to turn from an upward side toward a downward side and to pin down a fixing bar of the wheelchair due to the slide shaft moving in the backward direction, and being configured to turn from the downward side toward the upward side and to release pinning down of the fixing bar due to the slide shaft moving in the advancing direction, a pair of switch arm mechanisms configured to turn due to being pressed by the fixing bar of the wheelchair moving in the advancing direction, and lock switches configured to drive the drive mechanism by being pressed by the switch arm mechanisms that are turning, such that the slide shaft is moved in the backward direction.

In the wheelchair fixing device according to the first aspect of the present disclosure, the base member attached to the floor of the vehicle may be provided with the support member that supports the drive mechanism, and the lock arms may be provided on both sides of the base member so as to turn in the up-down direction. The end portions of the slide shaft, configured to move in the advancing direction and the backward direction of the wheelchair, by being driven by the drive mechanism, may be inserted into the respective cam hole portions of the lock arms. The drive mechanism may be driven by the switch arm mechanisms pressing the lock switches, the switch arm mechanisms being turned by being pressed by the fixing bar of the wheelchair moving in the advancing direction, to move the slide shaft in the backward direction. Thus, the lock arms may be configured to turn from the upward side to the downward side, to pin down the fixing bar of the wheelchair. The lock arms may be configured to turn from the downward side to the upward side by the slide shaft moving in the advancing direction, thereby releasing pinning down of the fixing bar of the wheelchair. Thus, according to the present disclosure, the mechanism of the device itself is simplified.

In the wheelchair fixing device according to the first aspect of the present disclosure, upper faces of end portions of the lock arms on a side of the backward direction may be inclined faces as viewed from an axial direction of the slide shaft, the inclined faces being configured such that lower faces of footrests of the wheelchair moving in the advancing direction come into sliding contact with the inclined faces, and the lock arms may be biased to turn toward the upward side, and also configured to turn toward the downward side by being pressed by the footrests of the wheelchair that is moving.

In the wheelchair fixing device according to the first aspect of the present disclosure, the upper faces of the end portions of the lock arms on the side of the backward direction may be the inclined faces as viewed from the axial direction of the slide shaft, over which the lower faces of the footrests of the wheelchair moving in the advancing direction may come into sliding contact. The lock arms may be biased to turn toward the upward side, and also configured to turn toward the downward side by being pressed by the footrests of the wheelchair that is moving. Accordingly, when the wheelchair boards and exits the vehicle, the footrests of the wheelchair are suppressed from being caught by the lock arms.

Further, in the wheelchair fixing device according to the first aspect of the present disclosure, the switch arm mechanisms may include first switch arms and second switch arms, the first switch arms being provided on the lock arms, the first switch arms being configured to be biased to turn in the backward direction, the first switch arms being configured to turn by being pressed in the advancing direction by the fixing bar, the second switch arms being provided on the base member, the second switch arms being configured to be biased to turn in the backward direction, and the second switch arms being configured to turn by being pressed in the advancing direction by the first switch arms that turn by being pressed in the advancing direction, and the lock switches may be provided on the base member and may be configured to be pressed by the second switch arms that are pressed in the advancing direction and turn.

In the wheelchair fixing device according to the first aspect of the present disclosure, the switch arm mechanisms may includes the first switch arms and second switch arms. The first switch arms may be provided on the lock arms, the first switch arms may be configured to be biased to turn toward the backward direction, and the first switch arms may be configured to turn by being pressed in the advancing direction by the fixing bar of the wheelchair. The second switch arm may be provided on the base member. The second switch arm may be configured to be biased to turn toward the backward direction, and the second switch arm may be configured to turn by being pressed in the advancing direction by the first switch arms that turn by being pressed in the advancing direction. The lock switches may be provided on the base member, and may be pressed by the second switch arms that are pressed in the advancing direction and turn. Accordingly, the turning range of the switch arm mechanisms (first switch arms) is reduced, and the length of the device itself in the advancing direction and backward direction is reduced. That is to say, the size of the device itself is reduced.

Further, the wheelchair fixing device according to the first aspect of the present disclosure may include a lock release switch that is provided on the base member, and that is configured to drive the drive mechanism and move the slide shaft in the advancing direction, by being operated by a caregiver assisting with the wheelchair.

In the wheelchair fixing device according to the first aspect of the present disclosure, the lock release switch that drives the drive mechanism and moves the slide shaft in the advancing direction, by being operated by the caregiver assisting with the wheelchair, may be provided on the base member. Accordingly, installation of the wheelchair fixing device in the present disclosure is easier as compared to that in the case where the lock release switch is provided separately from the wheelchair fixing device.

Further, the wheelchair fixing device according to the first aspect of the present disclosure may include a cover member that covers the support member, the slide shaft, part of the lock arms, part of the first switch arms, the second switch arms, and the lock switches, and that does not cover the lock release switch, the cover member may be provided with slit portions, and the lock arms and the first switch arms may protrude from the slit portions toward outside of the cover member.

The wheelchair fixing device according to the first aspect of the present disclosure may include the cover member that covers the support member, the slide shaft, part of the lock arms, part of the first switch arms, the second switch arms, and the lock switches, and that does not cover the lock release switch. The cover member may be provided with slit portions. The lock arms and the first switch arms may protrude from the slit portions toward the outside of the cover member. Accordingly, intrusion of dust or the like into inside of the wheelchair fixing device is suppressed.

Also, in the wheelchair fixing device according to the first aspect of the present disclosure, the drive mechanism may include a drive motor, a control device configured to control the drive motor, a gear of which an axial direction is the up-down direction, and that is configured to be turned in both forward and reverse directions by the drive motor, a moving member to which the slide shaft is attached, and a drive rod of which a first end portion is attached to a peripheral edge portion of the gear and a second end portion is attached to the moving member.

In the wheelchair fixing device according to the first aspect of the present disclosure, the drive mechanism may include the drive motor, the control device configured to control the drive motor, the gear of which the axial direction is the up-down direction, and that is configured to be turned in both forward and reverse directions by the drive motor, the moving member to which the slide shaft is attached, and the drive rod of which the first end portion is attached to the peripheral edge portion of the gear and the second end portion is attached to the moving member. Accordingly, the height of the device itself is reduced. That is to say, the thickness of the device itself is reduced.

In the wheelchair fixing device according to the first aspect of the present disclosure, the lock switches may be configured to transmit lock signals to the control device when pushed by the switch arm mechanisms.

In the wheelchair fixing device according to the first aspect of the present disclosure, a lock release switch may be configured to transmit an unlock signal to the control device when operated.

In the wheelchair fixing device according to the first aspect of the present disclosure, the lock arms may have notch portions configured to fit the fixing bar.

In the wheelchair fixing device according to the first aspect of the present disclosure, the base member may include a pair of side wall portions facing each other in the axial direction of the slide shaft, and the lock arms may be attached to the side wall portions of the base member via shaft portions.

A wheelchair fixing system according to a second aspect of the present disclosure includes a wheelchair including a fixing bar, a base member that is attached to a floor of a vehicle, a support member that is provided on the base member, a drive mechanism that is supported by the support member, a slide shaft that is configured to move in an advancing direction and a backward direction of the wheelchair, by being driven by the drive mechanism, a pair of lock arms that is provided on both sides of the base member in an axial direction of the slide shaft, so as to turn in an up-down direction and that has cam hole portions into which end portions of the slide shaft are respectively inserted, the lock arms being configured to turn from an upward side toward a downward side and to pin down the fixing bar of the wheelchair due to the slide shaft moving in the backward direction, and being configured to turn from the downward side toward the upward side and to release pinning down of the fixing bar due to the slide shaft moving in the advancing direction, a pair of switch arm mechanisms configured to turn due to being pressed by the fixing bar of the wheelchair moving in the advancing direction, and lock switches configured to drive the drive mechanism by being pressed by the switch arm mechanisms that are turning, such that the slide shaft is moved in the backward direction.

In the wheelchair fixing system according to the second aspect of the present disclosure, the wheelchair may include a front wheel and a rear wheel, and the fixing bar may be provided between the front wheel and the rear wheel, an axial direction of the fixing bar being along a width direction of the wheelchair.

As described above, according to the present disclosure, the mechanism of the wheelchair fixing device itself can be simplified.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
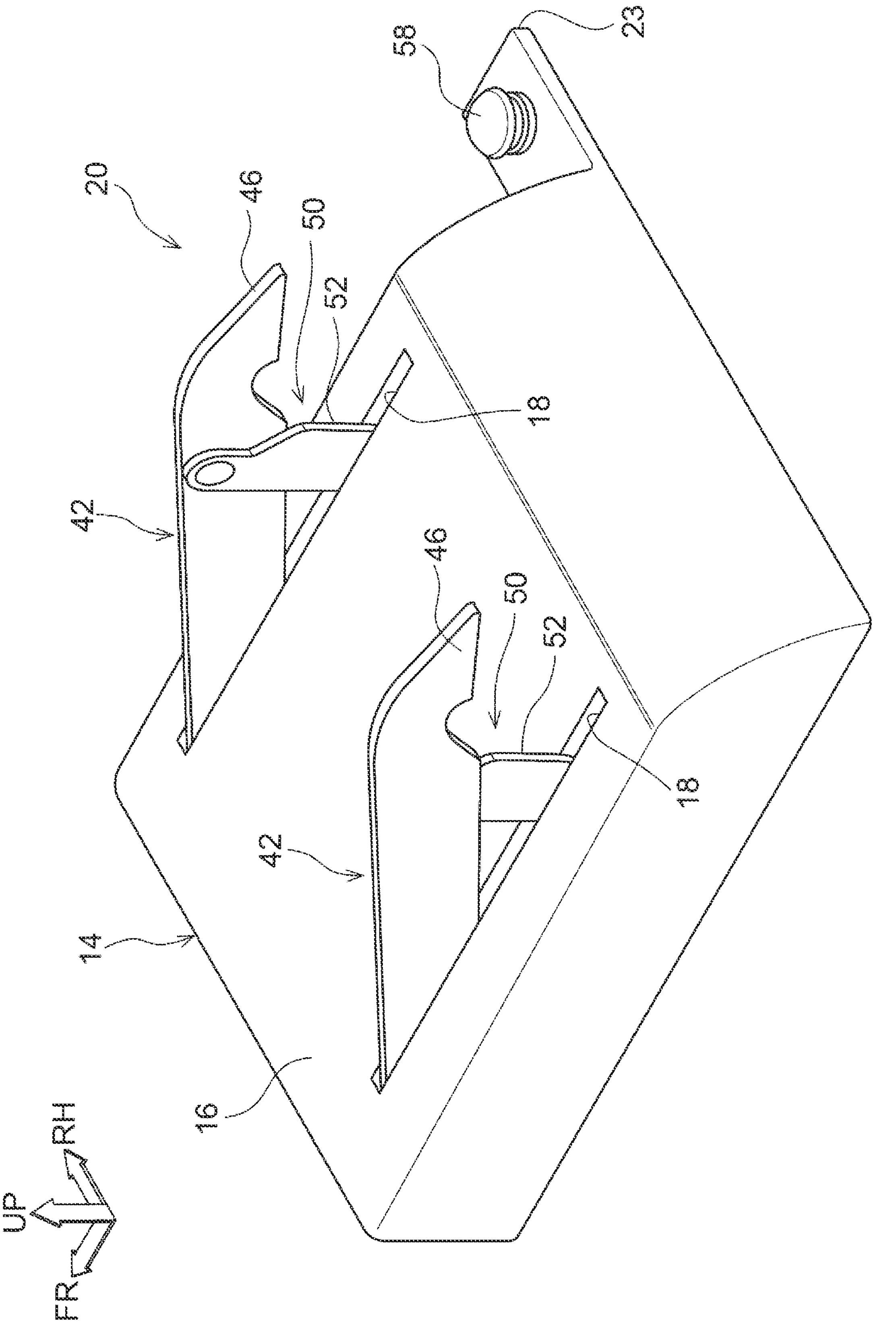
FIG. 1 is a schematic perspective view illustrating an external appearance of a wheelchair fixing device according to an embodiment.

An embodiment according to the present disclosure will be described below in detail with reference to the drawings. Note that for convenience of description, an arrow UP, an arrow FR, and an arrow RH illustrated in the drawings as appropriate, indicate an upward direction of a vehicle, a forward direction of the vehicle, and a rightward direction of the vehicle, respectively. Accordingly, when terms indicating up-down, front-rear, and right-left directions are used in the following description without any particular specification, these mean up-down, front-rear, and right-left of the vehicle.

Also, in the present embodiment, a wheelchair 60, which will be described later, is assumed to board a vehicle 10 from a rearward side thereof, in a forward-facing orientation. Therefore, an advancing direction (forward direction of vehicle) of the vehicle is the advancing direction (forward direction) of the wheelchair 60, and arrows UP, FR, and RH are also an upper side, a front side, and a right side of the wheelchair 60, respectively. Also, hereinafter, the advancing direction of the wheelchair 60 may be simply referred to as "advancing direction", and a backward direction that is the direction opposite to the advancing direction of the wheelchair 60 may simply be referred to as "backward direction".

Figure 2:
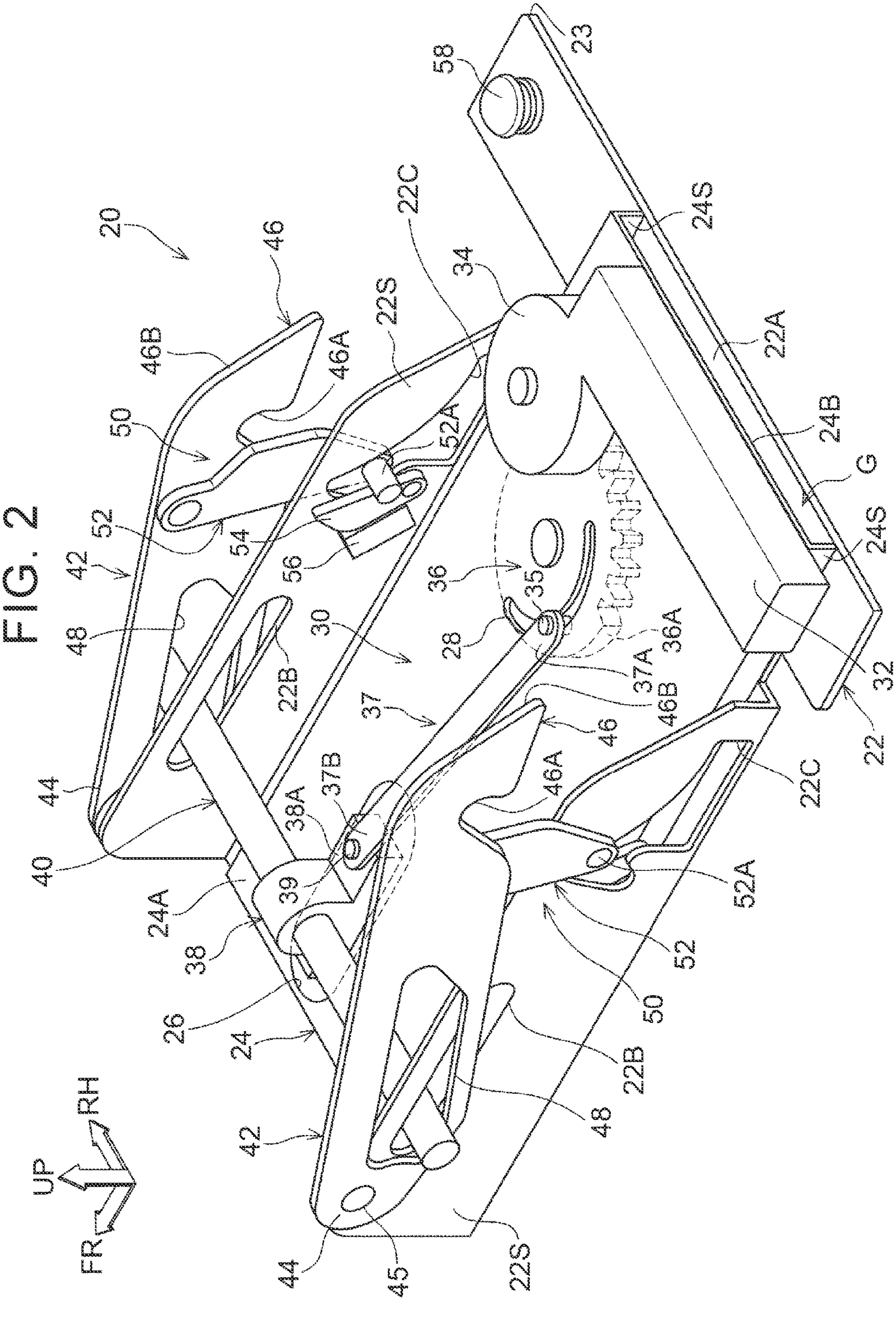
FIG. 2 is a schematic perspective view illustrating an internal structure of the wheelchair fixing device according to the embodiment.
Figure 3:
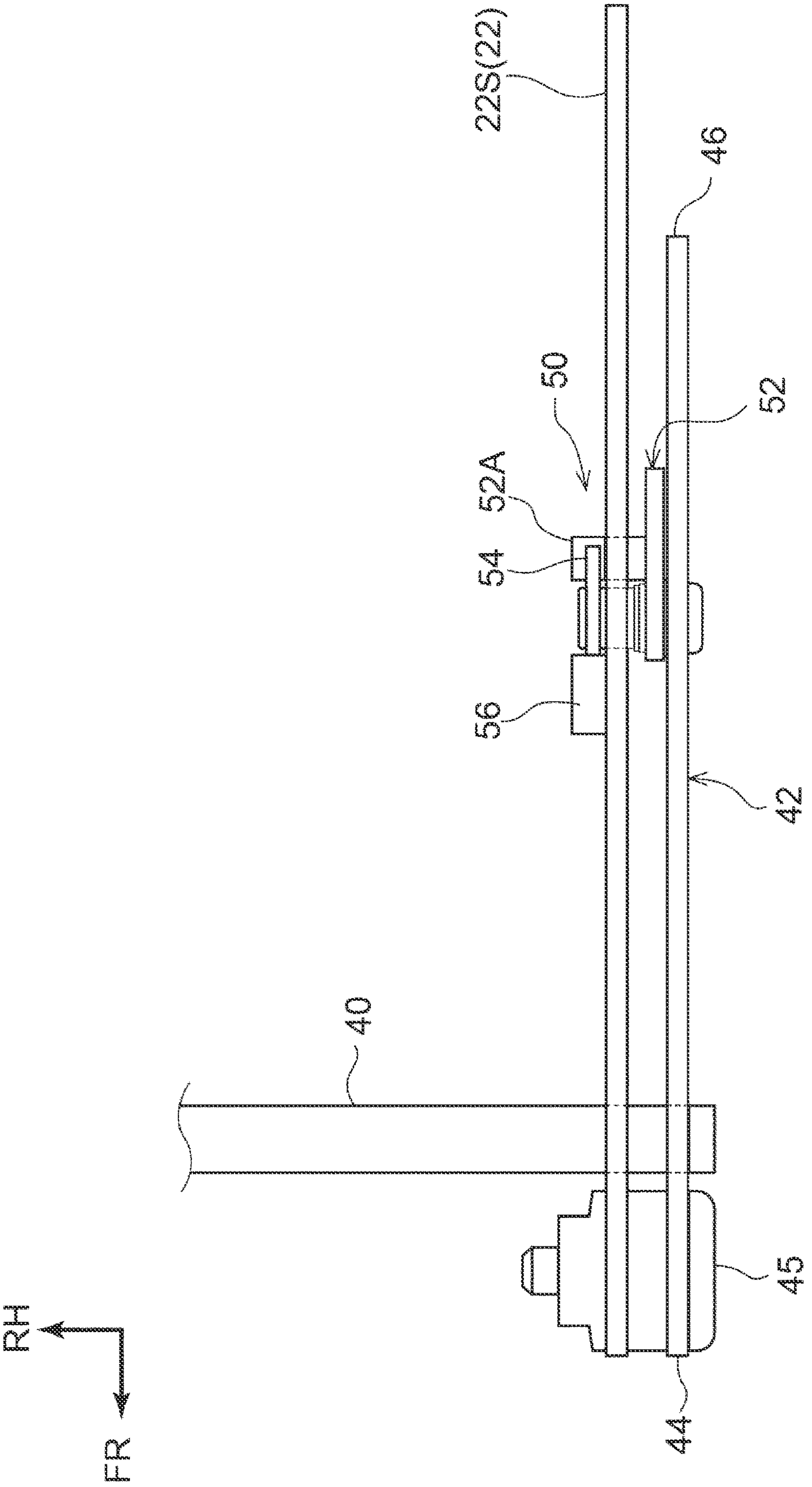
FIG. 3 is a schematic plan view illustrating part of the internal structure of the wheelchair fixing device according to the embodiment.

As illustrated in FIGS. 1 and 2, a wheelchair fixing device 20 according to the present embodiment is attached to an upper face of a floor 12 (see FIGS. 4 to 6 and 9) of a vehicle cabin of the vehicle 10. The floor 12 may be a horizontal flat face, or a flat face that is inclined at a predetermined angle. Note that the vehicle 10 in which the wheelchair fixing device 20 is installed may be any vehicle which the wheelchair 60 is capable of boarding, such as a van, a minivan, or the like. Further, the wheelchair fixing device 20 can be installed in a mass transit system, for example, in a bus or the like.

The wheelchair fixing device 20 is covered by a cover member 14, except for a lock release switch 58 which will be described later. An upper wall 16 of the cover member 14 is provided with a right and left pair of slit portions 18 elongated in a front-rear direction. Distal end portion 46 sides of a right and left pair of lock arms 42 and a right and left pair of first switch arms 52, which will be described later, protrude from the slit portions 18, respectively.

Figure 9:
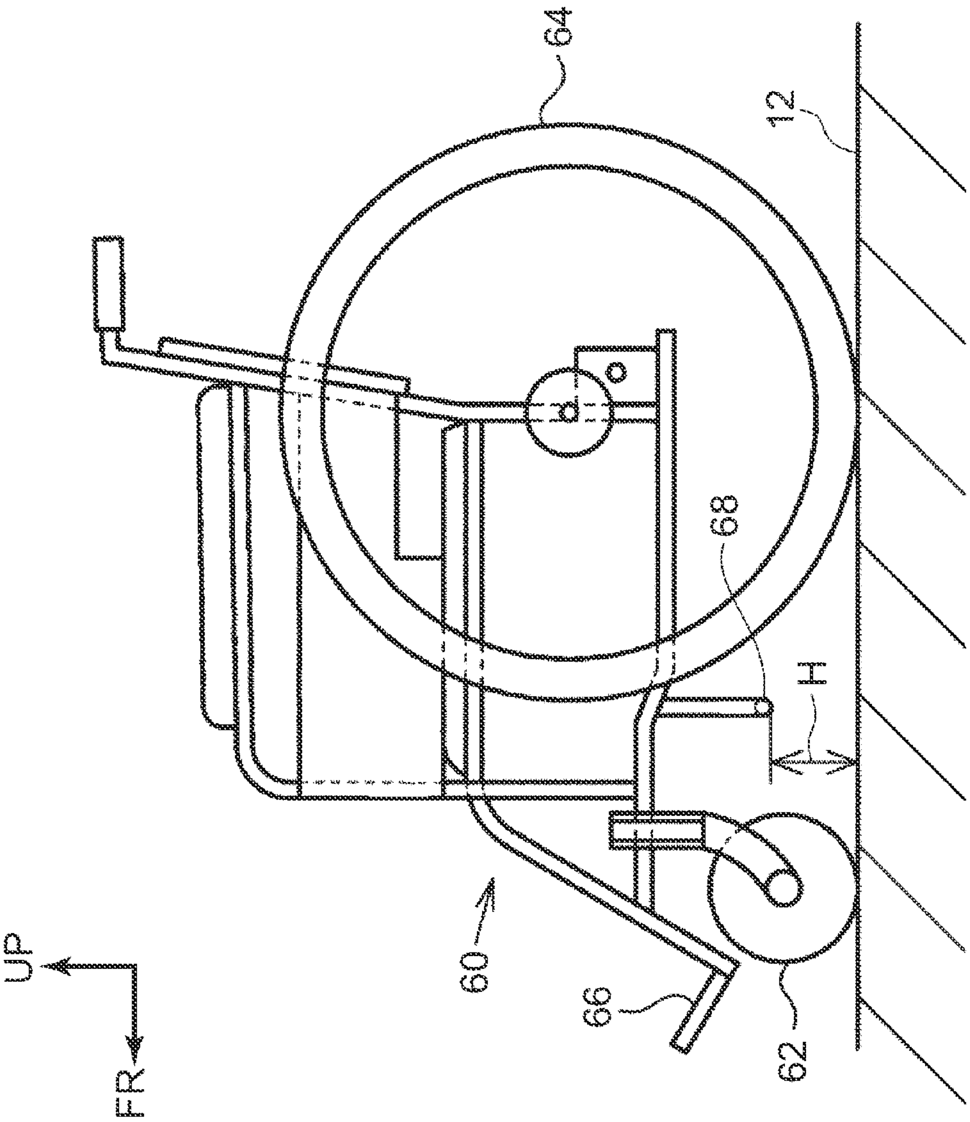
FIG. 9 is a schematic side view illustrating the wheelchair locked by the wheelchair fixing device according to the embodiment.

Note that as illustrated in FIG. 9, the wheelchair 60 locked by the wheelchair fixing device 20 has a fixing bar 68 around an intermediate position between front wheels 62 and rear wheels 64. The fixing bar 68 has a cylindrical shape with a diameter of 12 mm, for example, and is installed at a position in which a lower end face thereof is at a height H (H=40 mm to 50 mm) from the floor 12, with a width direction of the wheelchair 60 as an axial direction thereof. A configuration is made in which the fixing bar 68 comes into contact with the first switch arms 52 protruding from the cover member 14, and is locked by being pinned down by the distal end portions 46 of the lock arms 42 from an upward side.

As illustrated in FIG. 2, the wheelchair fixing device 20 has a base member 22 attached to the upper face of the floor 12 with screws or the like that are omitted from illustration. The base member 22 is formed in a substantially broad "U" shape as in frontal view along the front-rear direction, and a support plate 24 serving as a support member for supporting a drive mechanism 30 is provided on an inner side thereof.

The support plate 24 is formed in a shape of a substantially rectangular flat plate having approximately the same size as an upper face of the base member 22, and has side walls portions 24S of a predetermined height that are formed on both right and left end portions thereof by being bent toward a downward side and thus erected. These side wall portions 24S are configured to form a gap G of a predetermined height (slightly larger than a thickness of a gear 36 described later) between an upper face 22A of the base member 22 and a lower face 24B of the support plate 24.

The drive mechanism 30 includes a drive motor 34, which is a low-profile electric motor (having a thickness in side view so as to not extend upward from side wall portions 22S, which will be described later), provided at a rear portion of an upper face 24A of the support plate 24, and a control device 32 with a low profile (having a thickness in side view so as to not extend upward from the side wall portions 22S, which will be described later) for controlling the drive motor 34 provided at the rear portion of the upper face 24A of the support plate 24. The drive motor 34 and the control device 32 are configured to be driven by electric power supplied from a battery (omitted from illustration) such as a rechargeable battery or the like, incorporated in the control device 32. Note that illustration of wiring of each part including these is omitted.

A rotation shaft (omitted from illustration) of the drive motor 34 passes through the support plate 24 and protrudes toward the downward side, and a drive gear (omitted from illustration) is fixed to the rotation shaft. The drive mechanism 30 has the gear 36 that is turnably provided on the lower face 24B at a rear side of the support plate 24, with an up-down direction being the axial direction thereof. This gear 36 meshes with the drive gear of the drive motor 34, and is configured to be turnable in both forward and reverse directions by rotational driving by the drive motor 34.

Also, the drive mechanism 30 has a slider 38 serving as a moving member, which is capable of moving in the front-rear direction, at a middle portion in the right-left direction of a front portion of the support plate 24. A slot 26 that is substantially elliptical and of which the longitudinal direction is the front-rear direction is formed passing through the middle portion at the front portion of the support plate 24 in the right-left direction, and a lower end portion of the slider 38 is inserted through the slot 26 and is slidably supported on the upper face of the base member 22. That is to say, the slider 38 is capable of reciprocal movement (sliding) in the front-rear direction along the slot 26.

Also, the drive mechanism 30 has a drive rod 37, of which one end portion 37A (which can be regarded as an example of a first end portion in the present disclosure) is attached to a peripheral edge portion 36A of the gear 36, and other end portion 37B (which can be regarded as an example of a second end portion in the present disclosure) is attached to a rear end portion 38A of the slider 38. A slot 28 of a predetermined size (length) curved in a substantially arcuate shape in plan view is formed in a portion of the support plate 24 that faces a path of turning of the peripheral edge portion 36A of the gear 36 in the up-down direction.

A pin 35, which is cylindrical, can be inserted through this slot 28, a lower end portion of this pin 35 is attached to the peripheral edge portion 36A of the gear 36, and an upper end portion of this pin 35 is attached to the one end portion 37A of the drive rod 37. That is to say, the peripheral edge portion 36A of the gear 36 and the one end portion 37A of the drive rod 37 are turnably coupled by the pin 35 inserted through the slot 28. Thus, the one end portion 37A of the drive rod 37 and the peripheral edge portion 36A (the pin 35) of the gear 36 are configured to be capable of moving along the slot 28.

In side view, the slider 38 has a shape including a portion that protrudes upward at the middle portion in the front-rear direction, and the rear end portion 38A extending toward the rearward side is turnably coupled to the other end portion 37B of the drive rod 37 by a pin 39. At a middle portion in the axial direction of a slide shaft 40 that is cylindrical, of which the axial direction is the right-left direction, is attached to the middle portion of the slider 38 in the front-rear direction thereof.

According to the drive mechanism 30 configured as described above (specifically, the mechanism in which the gear 36 is turned in both forward and reverse directions via the drive gear, by the rotational driving of the drive motor 34 controlled by the control device 32, and the slider 38 moves in the front-rear direction via the drive rod 37), the slide shaft 40 is capable of reciprocally moving (sliding) in the advancing direction and the backward direction of the wheelchair 60.

Both right and left sides of the base member 22 are formed as the side wall portions 22S of a predetermined height that are bent upward and thus erected. The lock arms 42 are respectively provided overlapping on outer sides of the side wall portions 22S so as to be turnable in the up-down direction. Each of the right and left lock arms 42 is formed in a flat plate shape of which the front-rear direction is the longitudinal direction, and a basal portion 44 disposed at a front end portion of the base member 22 is turnably attached to a front end portion of the side wall portion 22S of the base member 22 by a shaft portion 45 of which the axial direction is the right-left direction.

A torsion spring (omitted from illustration), serving as an example of a biasing member, is provided on each shaft portion 45 that is turnably supports each basal portion 44, such that the distal end portion (end portion toward the backward direction side of the wheelchair 60) 46 side of each lock arm 42 disposed on a rear portion side of the base member 22 is always biased upward. That is to say, one end portion of the torsion spring is retained by the lock arm 42 and the other end of the torsion spring is retained by the base member 22.

The side wall portions 22S of the base member 22 are each formed with a slot 22B, of which the front-rear direction is the longitudinal direction, through which both end portions of the slide shaft 40 in the axial direction are respectively inserted, and a cam hole portion 48 into which both of the end portions of the slide shaft 40 in the axial direction are respectively inserted is formed partway along each lock arm 42 in the longitudinal direction thereof. Each cam hole portion 48 is formed in a predetermined cam shape of which the longitudinal direction is the front-rear direction. A substantially arcuate notch portion 46A, into which the fixing bar 68 of the wheelchair 60 is fitted (retaining the fixing bar 68), is formed on a lower side of the distal end portion 46 of each lock arm 42.

Figure 6:
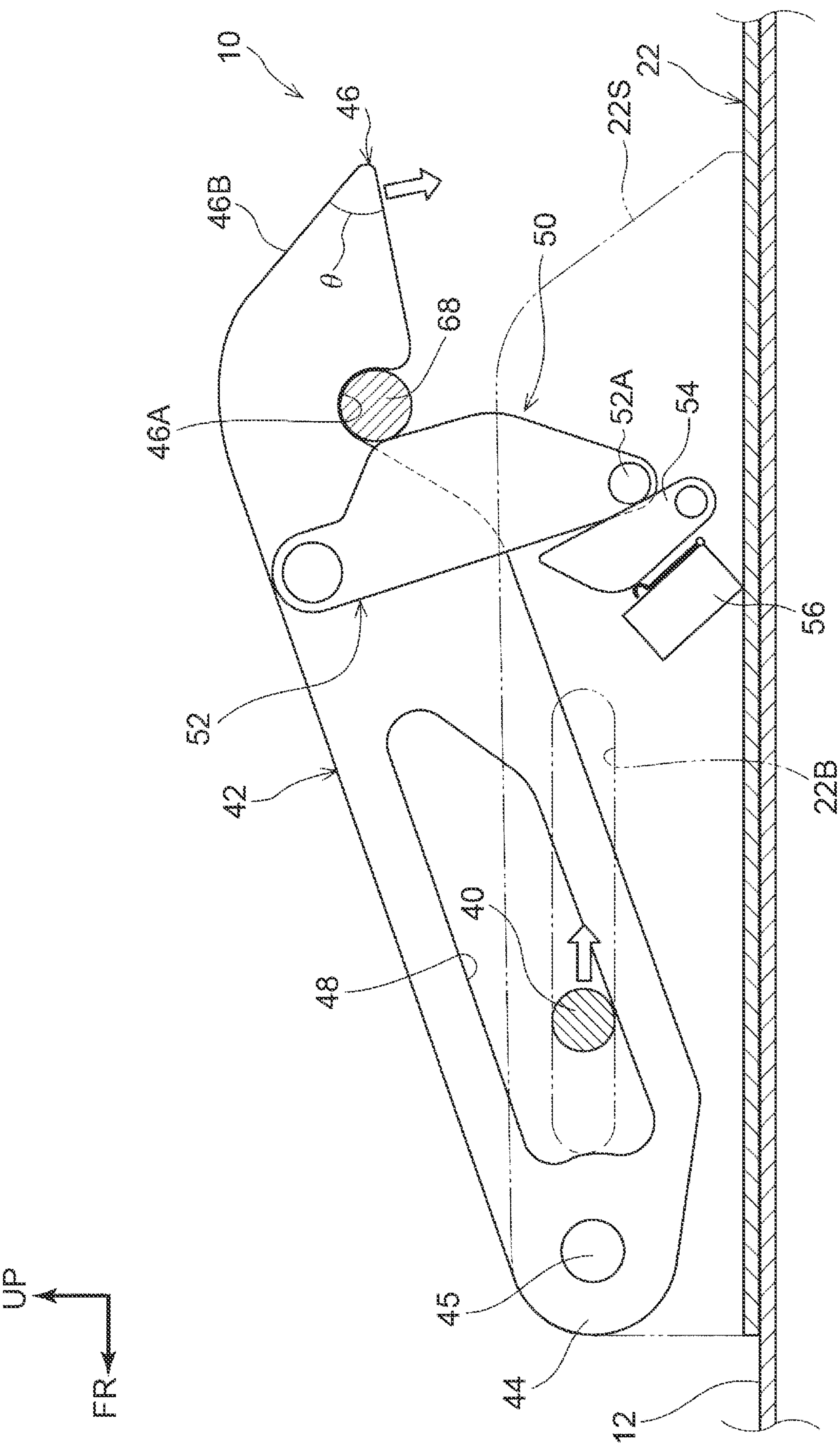
FIG. 6 is a schematic side view illustrating an enlarged view of a state of the wheelchair fixing device according to the embodiment immediately after being locked.

As illustrated in FIG. 6, each lock arm 42 that is configured as described above has a configuration in which each distal end portion 46 turns from the upward side to the downward side against biasing force by the torsion spring, by the slide shaft 40 moving rearward (in the backward direction of the wheelchair 60), thereby pinning down the fixing bar 68 provided on the wheelchair 60. That is to say, the notch portion 46A of each lock arm 42 is configured to be fitted to the fixing bar 68 of the wheelchair 60, such that each lock arm 42 locks the wheelchair 60 so as not to move.

In this configuration, as the slide shaft 40 moves toward the forward side (in the advancing direction of the wheelchair 60), the distal end portion 46 of each lock arm 42 turns from the downward side to the upward side under the biasing force (returning force) of the torsion spring, and the pinning down of the fixing bar 68 of the wheelchair 60 is released. That is to say, the notch portion 46A of each lock arm 42 is configured to be removed from the fixing bar 68, such that each lock arm 42 unlocks the wheelchair 60 so as to capable of moving.

As viewed from the axial direction of the slide shaft 40, an upper face of the distal end portion 46 of each lock arm 42 has an inclined face 46B that is at a predetermined angle θ (see FIGS. 4 to 6), over which a lower face of a footrest 66 of the advancing (moving in the forward direction) wheelchair 60 can come into sliding contact. This is because the footrests 66 of the wheelchair 60 are also inclined toward an obliquely forward and upward side at a predetermined angle with respect to a lateral direction, as illustrated in FIG. 9.

Figure 7A:
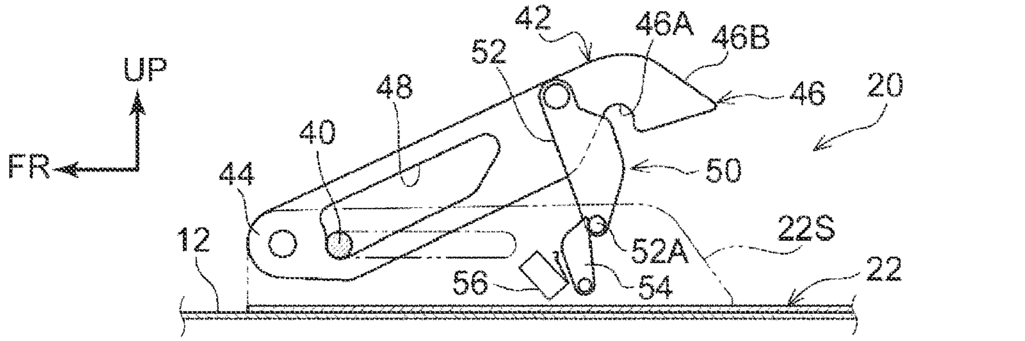
FIG. 7A is a schematic side view illustrating operations of the wheelchair fixing device according to the embodiment when a wheelchair boards a vehicle.
Figure 7B:
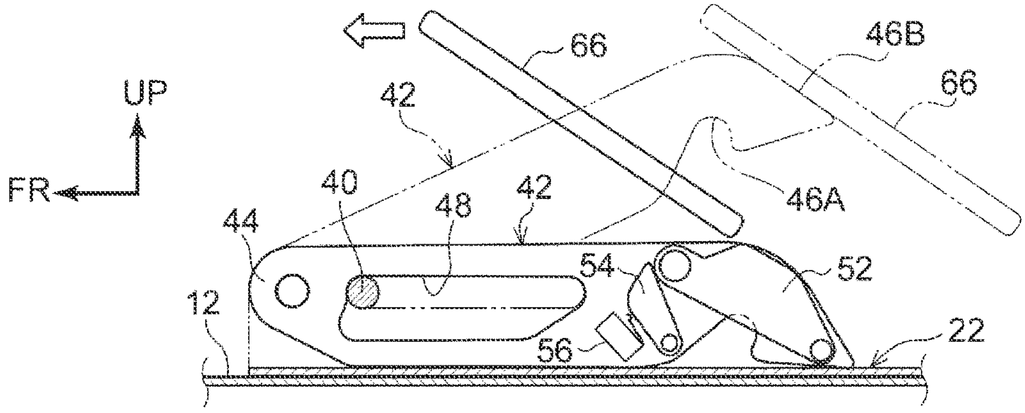
FIG. 7B is a schematic side view illustrating operations of the wheelchair fixing device according to the embodiment when the wheelchair boards the vehicle.

That is to say, as illustrated in FIG. 7B, the inclined face 46B of each lock arm 42 is arranged to be pressed by the lower face of the footrest 66 from the upward side, and to be capable of turning toward the downward side while in sliding contact relative to the footrest 66, without being caught on the lower face of the footrest 66 of the wheelchair 60 that is advancing, and hindering the wheelchair 60 from boarding.

Accordingly, the angle θ at the distal end portion 46 of each lock arm 42 is set in accordance with the inclination angle of the footrest 66 of the wheelchair 60, and is generally 35 degrees to 45 degrees or 38 degrees to 42 degrees, and is 40 degrees in the present embodiment. Also, each lock arm 42 is configured to be pressed from the upward side without being caught by the footrest 66 even when the wheelchair 60 moves backward (moves in the backward direction), and thus is turnable to the downward side by being pressed by the footrest 66 from the upward side (see FIG. 8D).

Further, as illustrated in FIGS. 1 to 6, between each lock arm 42 and side wall portion 22S of the base member 22, there is provided a right and left pair of switch arm mechanisms 50, that turns in the advancing direction thereof by being pressed to the forward side by the fixing bar 68 of the wheelchair 60 that is advancing, thereby pressing (turning on) respective lock switches 56, which will be described later. Note that since each switch arm mechanism 50 has a laterally symmetrical shape and the same configuration, the switch arm mechanism 50 on one side will be described below.

The switch arm mechanism 50 includes a first switch arm 52 that is provided on the lock arm 42 so as to be biased to turn to the backward direction, and to turn by being pressed to the advancing direction by the fixing bar 68, and a second switch arm 54 that is provided on the base member 22 so as to be biased to turn to the backward direction, and to turn by being pressed to the advancing direction by a pin 52A that is cylindrical, provided on a lower end portion of the first switch arm 52 that has turned by being pressed in the advancing direction.

The first switch arm 52 has a flat rear end face that the fixing bar 68 comes into contact with, and the pin 52A that juts out from the lower end portion of the first switch arm 52 toward an inward side of the base member 22 at a predetermined height. A through hole 22C having a predetermined size and shape is formed in a rear portion of the side wall portion 22S of the base member 22, into which the pin 52A is inserted, and which allows movement of the pin 52A.

Note that the configuration for biasing the first switch arm 52 in the backward direction is the same as that of the lock arm 42. That is to say, a torsion spring (omitted from illustration), as an example of a biasing member, is provided on a shaft portion that turnably attaches the first switch arm 52 to the lock arm 42, one end portion of the torsion spring is retained by the first switch arm 52, and the other end portion of the torsion spring is retained by the lock arm 42.

Note that the configuration for biasing the second switch arm 54 in the backward direction is also the same as that of the lock arm 42. That is to say, a torsion spring (omitted from illustration), as an example of a biasing member, is provided on a shaft portion that turnably attaches the second switch arm 54 to the base member 22, one end portion of the torsion spring is retained by the second switch arm 54, and the other end portion of the torsion spring is retained by the base member 22.

The lock switch 56, which is electrically connected to the control device 32, is provided on an inner face side of the side wall portion 22S of the base member 22. The lock switch 56 is turned on by being pressed by the second switch arm 54 of the switch arm mechanism 50 that is pressed in the advancing direction and turned, and transmits a lock signal generated thereby to the control device 32. Upon receiving the lock signal, the control device 32 drives the drive mechanism 30 to move the slide shaft 40 in the backward direction.

Also, an extension portion 23 extending to the rightward side is integrally formed on a right side portion of the rear end portion of the base member 22, and the lock release switch 58 that is electrically connected to the control device 32 is provided on an upper face of the extension portion 23. The lock release switch 58 is turned on by being operated (depressed by foot) by a caregiver assisting the wheelchair 60, and an unlock signal generated thereby is transmitted to the control device 32. Upon receiving the unlock signal, the control device 32 drives the drive mechanism 30 to move the slide shaft 40 in the advancing direction.

Next, the operations of the wheelchair fixing device 20 according to the present embodiment that has the above configuration will be described.

Figure 4:
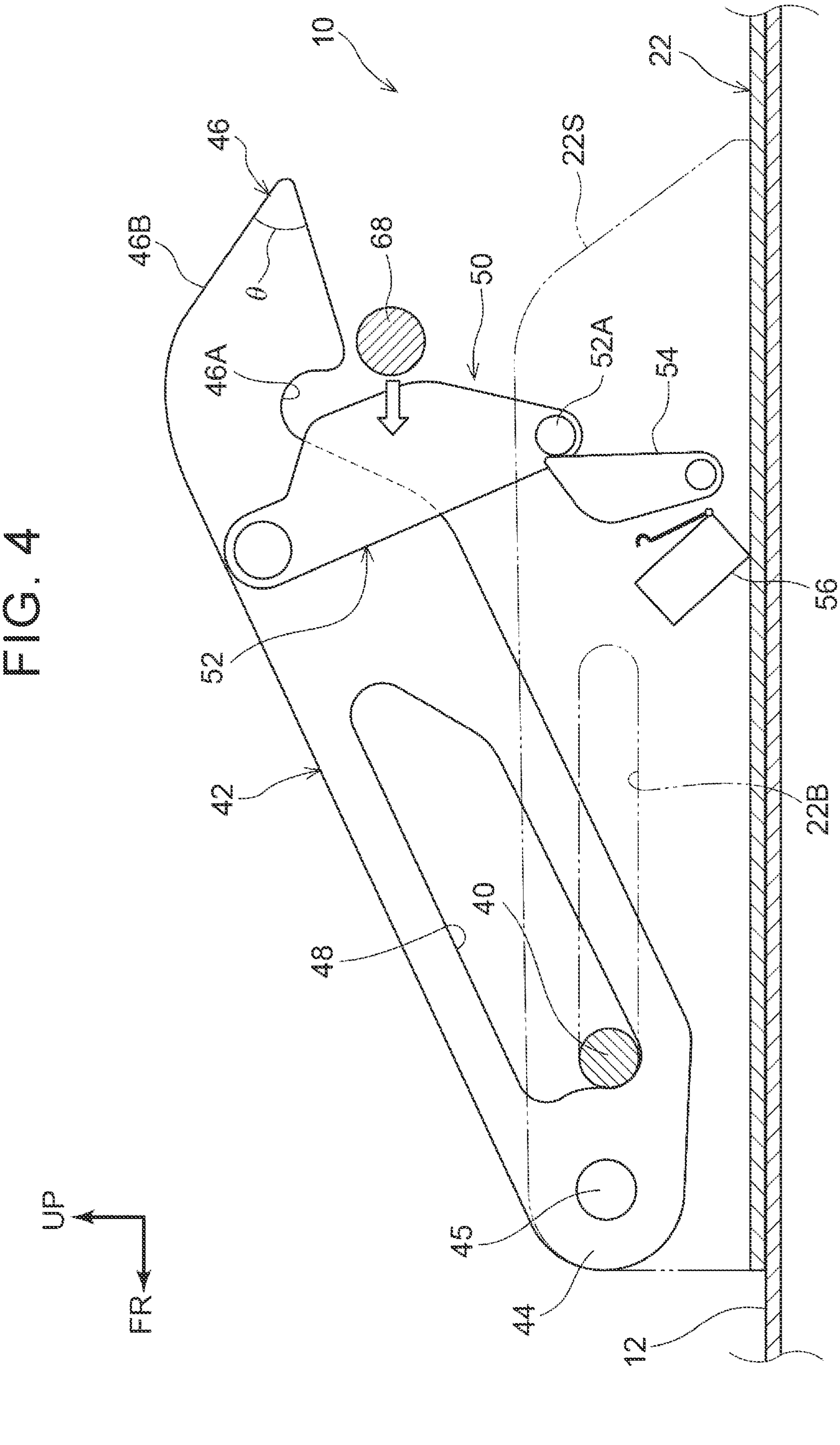
FIG. 4 is a schematic side view illustrating an enlarged view of a state of the wheelchair fixing device according to the embodiment immediately before being locked.
Figure 5:
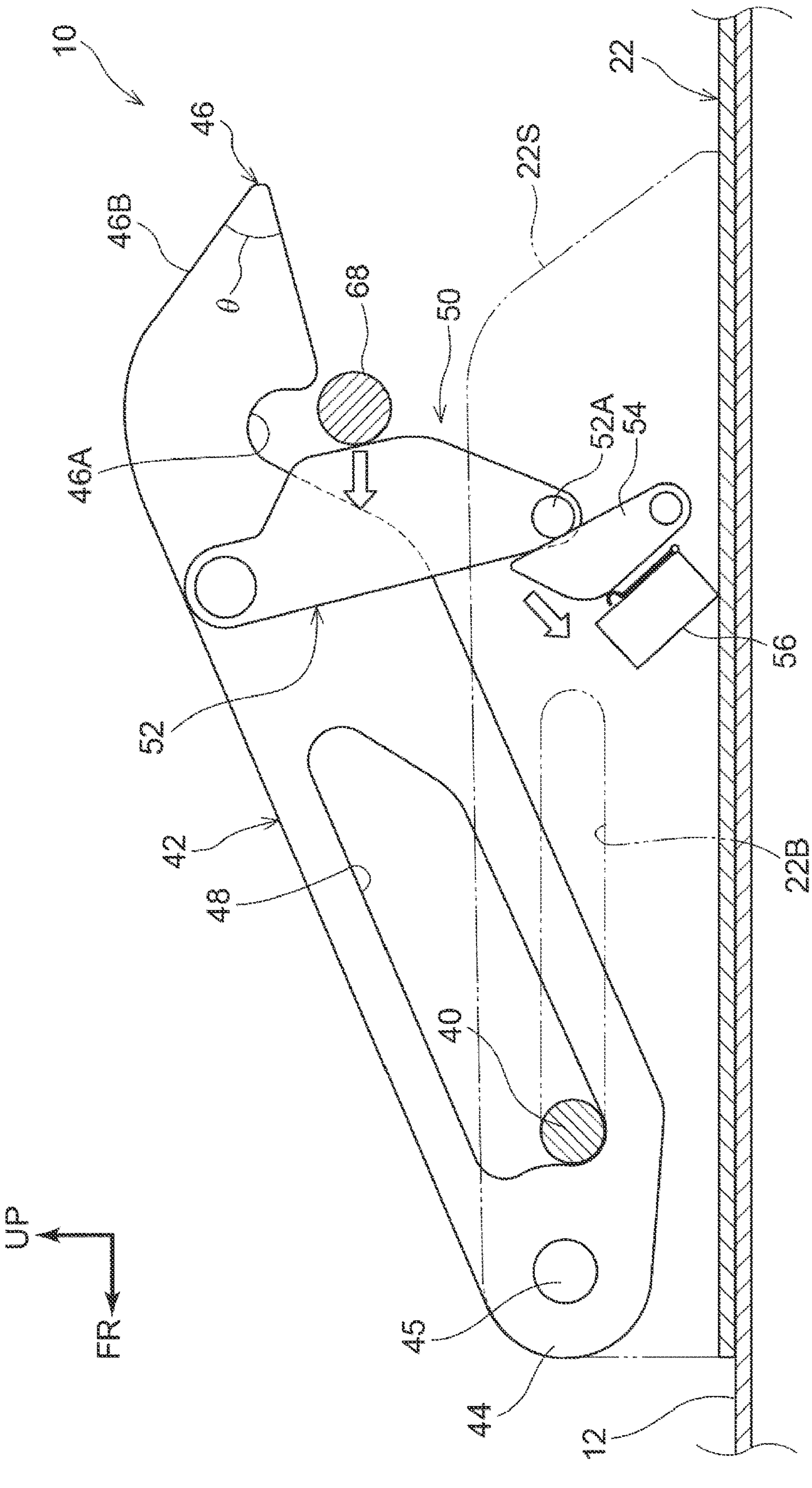
FIG. 5 is a schematic side view illustrating an enlarged view of a state of the wheelchair fixing device according to the embodiment partway through being locked.

As illustrated in FIGS. 4 to 6, the wheelchair fixing device 20 is attached to the upper face of the floor 12 of the vehicle 10. In this wheelchair fixing device 20, as illustrated in FIG. 1, the right and left lock arms 42 and the first switch arms 52 each protrude toward the upward side from the slit portions 18 formed in the upper wall 16 of the cover member 14, under the biasing force of respective torsion springs.

In this state, as illustrated in FIGS. 7A and 7B, the caregiver boards the vehicle 10 while pushing the wheelchair 60 in the advancing direction. Now, the upper face of the distal end portion 46 of each lock arm 42 is the inclined face 46B that has a predetermined angle θ in side view. Each lock arm 42 is configured to be turnable toward the downward side against the biasing force of the torsion spring, when pressed from the upward side.

Accordingly, when the caregiver boards the vehicle 10 while pushing the wheelchair 60 in the advancing direction, the lower faces of the footrests 66 of the wheelchair 60 come into sliding contact with the inclined face 46B of each lock arm 42 projecting to the upward side from the slit portions 18, and in doing so the footrests 66 can turn each lock arm 42 to the downward side against the biasing force of the torsion spring. Thus, when the wheelchair 60 boards the vehicle 10, the footrests 66 of the wheelchair 60 do not get caught on the distal end portions 46 of the lock arms 42. That is to say, the lock arms 42 do not hinder the wheelchair 60 from boarding.

Thus, when the footrests 66 of the wheelchair 60 pass over the upward sides of the lock arms 42, each lock arm 42 turns to the upward side under the biasing force of the torsion springs as illustrated in FIG. 4, and protrudes toward the upward side from the slit portion 18 again (see FIG. 1). When the wheelchair 60 is further advanced in this state, the fixing bar 68 of the wheelchair 60 comes into contact with the rear end faces of the right and left first switch arms 52 projecting to the upward side from the slit portions 18, along with the lock arms 42.

Figure 7C:
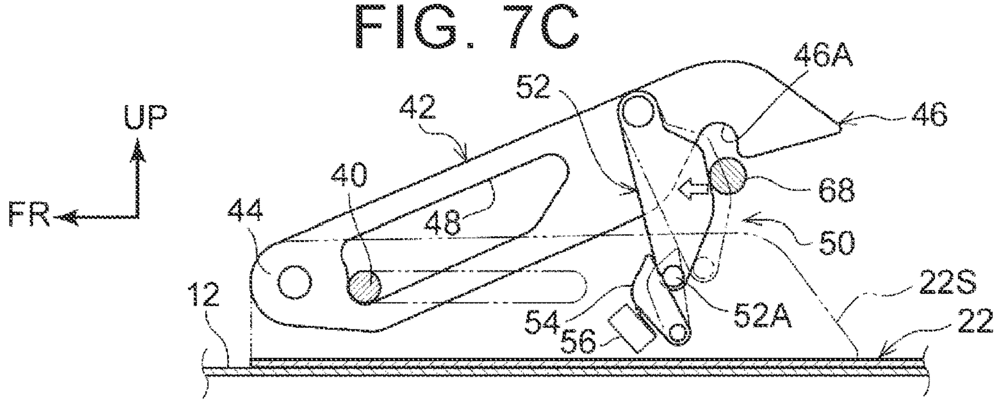
FIG. 7C is a schematic side view illustrating operations of the wheelchair fixing device according to the embodiment when the wheelchair boards the vehicle.

As illustrated in FIGS. 5 and 7C, the fixing bar 68 of the wheelchair 60, which is in contact with the rear end faces of the first switch arms 52, presses the first switch arms 52 in the advancing direction as the wheelchair 60 advances, thereby turning the first switch arms 52 in the advancing direction. The right and left second switch arms 54 then are pressed by the respective first switch arms 52 and turn in the advancing direction, and the second switch arms 54 respectively press the right and left pair of lock switches 56.

Thus, the lock switches 56 are turned on, and lock signals are transmitted to the control device 32. The drive motor 34 is then driven under control of the control device 32 that has received the lock signals, the slider 38 is moved in the backward direction via the drive gear, the gear 36, and the drive rod 37, and the slide shaft 40 is moved to the rearward side.

Figure 7D:
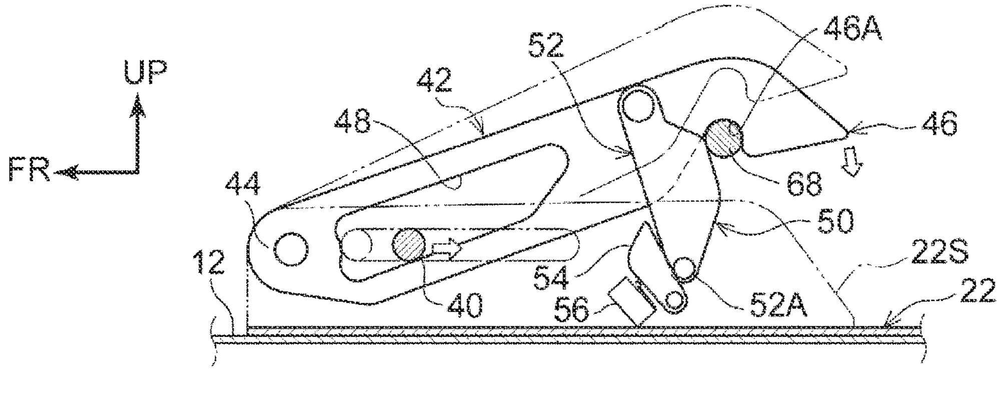
FIG. 7D is a schematic side view illustrating operations of the wheelchair fixing device according to the embodiment when the wheelchair boards the vehicle.

Thus, the distal end portions 46 of the lock arms 42 turn from the upward side to the downward side against the biasing force of the torsion springs, and the notch portions 46A fit onto the fixing bar 68 at their respective positions (substantially at a middle portion of the fixing bar 68 in the axial direction of the fixing bar 68). That is to say, as illustrated in FIGS. 6 and 7D, the lock arms 42 pin down the fixing bar 68 from the upward side, and the wheelchair 60 is locked so as not to move.

Note that the lock arms 42 are configured so as not to turn to the downward side unless the first switch arms 52 are pressed by the fixing bar 68, when the wheelchair 60 is slightly oblique with respect to the width direction thereof in plan view, i.e., when only one of the first switch arms 52 is pressed, the fixing bar 68 is not locked. Accordingly, locking failures do not occur in the first place, and the wheelchair 60 is reliably and automatically locked at the correct position. Thus, the usability of the wheelchair fixing device 20 can be improved.

Figure 8A:
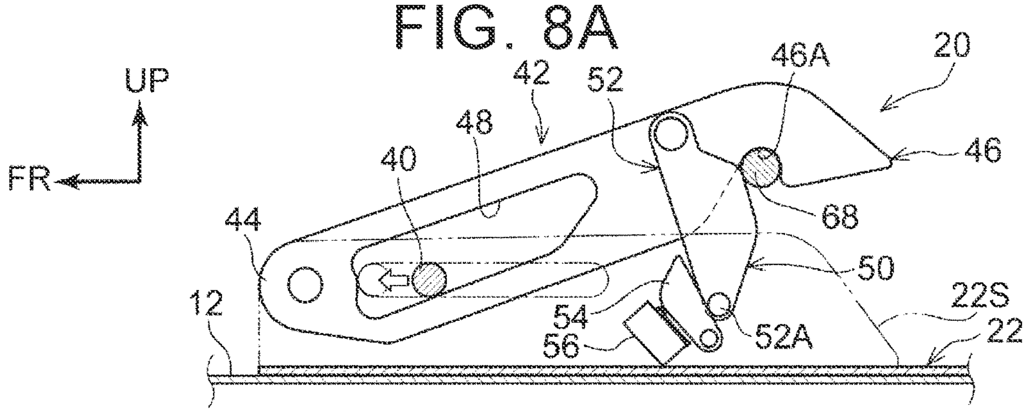
FIG. 8A is a schematic side view illustrating operations of the wheelchair fixing device according to the embodiment when the wheelchair exits the vehicle.

On the other hand, when the wheelchair 60 is to exit the vehicle 10, the caregiver depresses the lock release switch 58 with his or her foot. That is to say, the lock release switch 58 is turned on, and an unlock signal is transmitted to the control device 32. The drive motor 34 is then driven under control of the control device 32 that has received the unlock signal, the slider 38 is moved in the advancing direction via the drive gear, the gear 36, and the drive rod 37, and the slide shaft 40 is moved to the forward side, as illustrated in FIG. 8A.

Figure 8B:
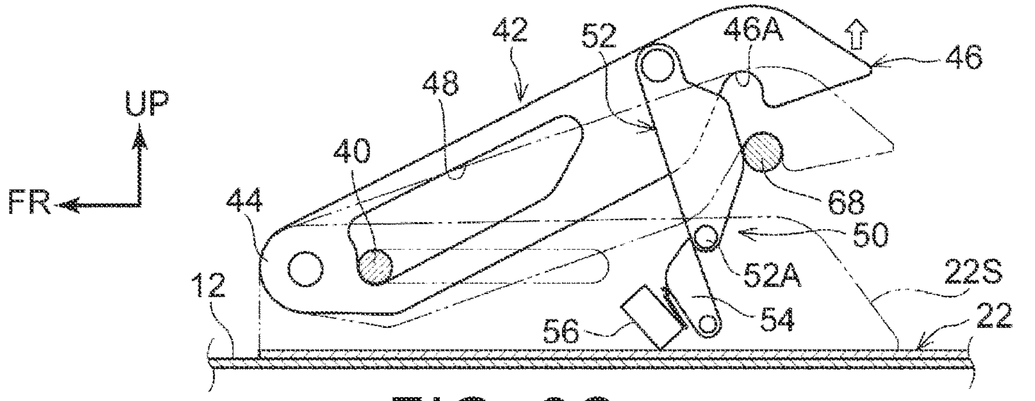
FIG. 8B is a schematic side view illustrating operations of the wheelchair fixing device according to the embodiment when the wheelchair exits the vehicle.

Thus, the distal end portions 46 of the lock arms 42 turn from the downward side to the upward side under the biasing force of the torsion springs (returning force), and the notch portions 46A are removed from their respective positions on the fixing bar 68 (substantially at a middle portion of the fixing bar 68 in the axial direction of the fixing bar 68). In other words, as illustrated in FIG. 8B, the pinning down of the fixing bar 68 by the lock arms 42 is released, and the wheelchair 60 is unlocked so as to be capable of moving.

Figure 8C:
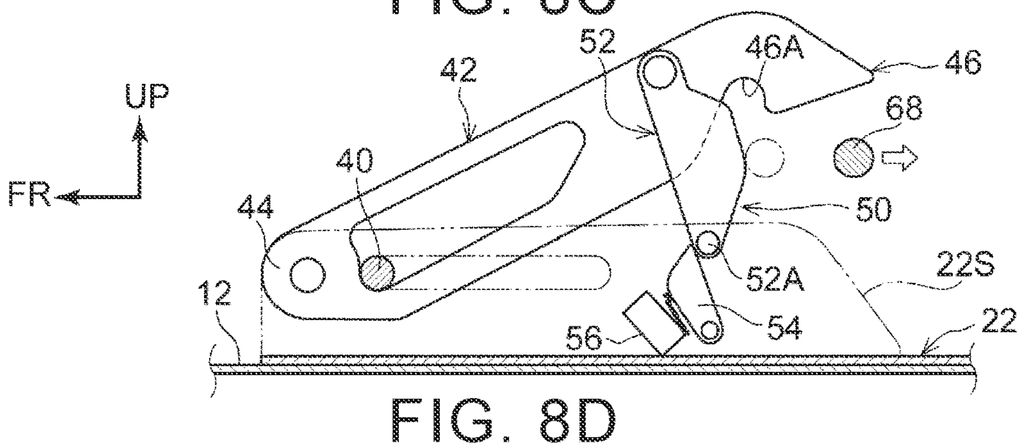
FIG. 8C is a schematic side view illustrating operations of the wheelchair fixing device according to the embodiment when the wheelchair exits the vehicle.
Figure 8D:
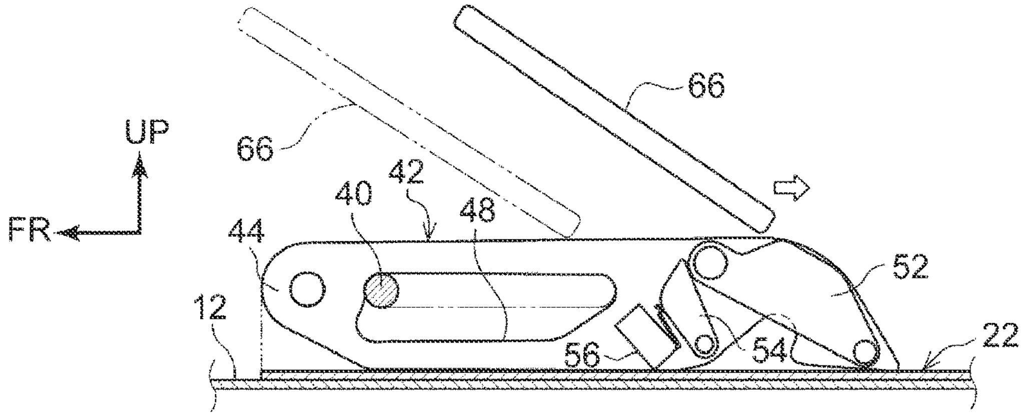
FIG. 8D is a schematic side view illustrating operations of the wheelchair fixing device according to the embodiment when the wheelchair exits the vehicle.

Once locking of the wheelchair 60 is released, the caregiver moves the wheelchair 60 backward, as illustrated in FIG. 8C. At this time, the distal end portion 46 sides of the lock arms 42 protrude upward from the slit portions 18, but as illustrated in FIG. 8D, the wheelchair 60 is capable of moving backward, by the footrests 66 pressing the distal end portion 46 sides of the lock arms 42 down into the cover member 14. That is to say, the wheelchair 60 can exit the vehicle 10 without the footrests 66 being caught in by the lock arms 42.

As described above, the wheelchair fixing device 20 according to the present embodiment has the configuration and operations such as described above. Accordingly, the mechanism of the device itself can be simplified. Also, the drive mechanism 30 supported by the support plate 24 includes the drive motor 34, the control device 32, the gear 36, the slider 38, and the drive rod 37, and accordingly the height of the device itself can be reduced. That is to say, the device itself can be given a low profile (specifically, the height thereof can be reduced to 40 mm or less, excluding the lock arms 42 and the first switch arms 52).

Also, the switch arm mechanisms 50 have the first switch arms 52 and the second switch arms 54 that are pressed by the first switch arms 52, and is configured such that the lock switches 56 are pressed by the second switch arms 54. Accordingly, the turning range of the switch arm mechanism 50 (the first switch arms 52) can be reduced, and the length of the device itself in the front-rear direction can also be reduced. That is to say, the device itself can be made smaller. Thus, the device can be installed in various types of vehicles.

Further, the wheelchair fixing device 20 according to the present embodiment is provided with the lock release switch 58. Accordingly, installation of the wheelchair fixing device 20 on the floor 12 of the vehicle 10 in the present disclosure is easier as compared to that in the case where the lock release switch 58 is provided separately from the wheelchair fixing device 20. Also, the wheelchair fixing device 20 according to the present embodiment includes the cover member 14 that covers parts other than the lock release switch 58. Thus, intrusion of dust or the like into inside of the wheelchair fixing device 20 can be suppressed.

Although the wheelchair fixing device 20 according to the present embodiment is described above with reference to the drawings, the wheelchair fixing device according to the present embodiment is not limited to that which is illustrated, and the design thereof can be changed as appropriate without departing from the scope of the present disclosure. For example, the lock release switch 58 is not limited to the structure provided at the illustrated position, and a configuration may be made in which an extension portion (omitted from illustration) extending to the rearward side may be integrally formed at the rear end portion of the base member 22, and the lock release switch 58 is provided on an upper face of the extension portion.

What is claimed is:

1. A wheelchair fixing device comprising:

a drive mechanism;

a support member that is provided on a base member attached to a floor of a vehicle, and that supports the drive mechanism;

a slide shaft that is configured to move in an advancing direction and a backward direction of a wheelchair, by being driven by the drive mechanism;

a pair of lock arms that is provided on both sides of the base member so as to turn in an up-down direction and that has cam hole portions into which end portions of the slide shaft are respectively inserted, the lock arms being configured to turn from an upward side toward a downward side and to pin down a fixing bar of the wheelchair due to the slide shaft moving in the backward direction, and being configured to turn from the downward side toward the upward side and to release pinning down of the fixing bar due to the slide shaft moving in the advancing direction;

a pair of switch arm mechanisms configured to turn due to being pressed by the fixing bar of the wheelchair moving in the advancing direction; and lock switches configured to drive the drive mechanism by being pressed by the switch arm mechanisms that are turning, such that the slide shaft is moved in the backward direction.

2. The wheelchair fixing device according to claim 1, wherein:

upper faces of end portions of the lock arms on a side of the backward direction are inclined faces as viewed from an axial direction of the slide shaft, the inclined faces being configured such that lower faces of footrests of the wheelchair moving in the advancing direction come into sliding contact with the inclined faces; and the lock arms are biased to turn toward the upward side, and are also configured to turn toward the downward side by being pressed by the footrests of the wheelchair that is moving.

3. The wheelchair fixing device according to claim 2, wherein:

the switch arm mechanisms include first switch arms and second switch arms, the first switch arms being provided on the lock arms, the first switch arms being configured to be biased to turn in the backward direction, the first switch arms being configured to turn by being pressed in the advancing direction by the fixing bar, the second switch arms being provided on the base member, the second switch arms being configured to be biased to turn in the backward direction, and the second switch arms being configured to turn by being pressed in the advancing direction by the first switch arms that turn by being pressed in the advancing direction; and the lock switches are provided on the base member and are configured to be pressed by the second switch arms that are pressed in the advancing direction and turn.

4. The wheelchair fixing device according to claim 3, further comprising a lock release switch that is provided on the base member, and that is configured to drive the drive mechanism and move the slide shaft in the advancing direction, by being operated by a caregiver assisting with the wheelchair.

5. The wheelchair fixing device according to claim 4, further comprising a cover member that covers the support member, the slide shaft, part of the lock arms, part of the first switch arms, the second switch arms, and the lock switches, and that does not cover the lock release switch, wherein:

the cover member is provided with slit portions; and the lock arms and the first switch arms protrude from the slit portions toward outside of the cover member.

6. The wheelchair fixing device according to claim 1, wherein the drive mechanism includes a drive motor, a control device configured to control the drive motor, a gear of which an axial direction is the up-down direction, and that is configured to be turned in both forward and reverse directions by the drive motor, a moving member to which the slide shaft is attached, and a drive rod of which a first end portion is attached to a peripheral edge portion of the gear and a second end portion is attached to the moving member.

7. The wheelchair fixing device according to claim 6, wherein the lock switches are configured to transmit lock signals to the control device when pressed by the switch arm mechanisms.

8. The wheelchair fixing device according to claim 4, wherein:

the drive mechanism includes a drive motor, a control device configured to control the drive motor, a gear of which an axial direction is the up-down direction, and that is configured to be turned in both forward and reverse directions by the drive motor, a moving member to which the slide shaft is attached, and a drive rod of which a first end portion is attached to a peripheral edge portion of the gear and a second end portion is attached to the moving member; and the lock release switch is configured to transmit an unlock signal to the control device when operated.

9. The wheelchair fixing device according to claim 1, wherein the lock arms have notch portions configured to fit the fixing bar.

10. The wheelchair fixing device according to claim 2, wherein:

the base member includes a pair of side wall portions facing each other in the axial direction of the slide shaft; and the lock arms are attached to the side wall portions of the base member via shaft portions.

11. A wheelchair fixing system comprising:

a wheelchair including a fixing bar;

a base member that is attached to a floor of a vehicle;

a support member that is provided on the base member;

a drive mechanism that is supported by the support member;

a slide shaft that is configured to move in an advancing direction and a backward direction of the wheelchair, by being driven by the drive mechanism;

a pair of lock arms that is provided on both sides of the base member in an axial direction of the slide shaft, so as to turn in an up-down direction and that has cam hole portions into which end portions of the slide shaft are respectively inserted, the lock arms being configured to turn from an upward side toward a downward side and to pin down the fixing bar of the wheelchair due to the slide shaft moving in the backward direction, and being configured to turn from the downward side toward the upward side and to release pinning down of the fixing bar due to the slide shaft moving in the advancing direction;

a pair of switch arm mechanisms configured to turn due to being pressed by the fixing bar of the wheelchair moving in the advancing direction; and lock switches configured to drive the drive mechanism by being pressed by the switch arm mechanisms that are turning, such that the slide shaft is moved in the backward direction.

12. The wheelchair fixing system according to claim 11, wherein:

the wheelchair includes a front wheel and a rear wheel; and the fixing bar is provided between the front wheel and the rear wheel, an axial direction of the fixing bar being along a width direction of the wheelchair.

* * * * *